(12) United States Patent
Ham

(10) Patent No.: US 6,990,861 B2
(45) Date of Patent: Jan. 31, 2006

(54) STRATIFIED HOT WATER HEATED DEPTH DISPLAY SYSTEM

(76) Inventor: Eric R. Ham, 3732 Logan Cres. S.W., Calgary, Alberta (CA) T3E 6Z6

( * ) Notice: Subject to any disclaimer, the term of this patent is extended or adjusted under 35 U.S.C. 154(b) by 88 days.

(21) Appl. No.: 10/440,372

(22) Filed: May 17, 2003

(65) Prior Publication Data

US 2004/0065148 A1 Apr. 8, 2004

Related U.S. Application Data

(60) Provisional application No. 60/416,444, filed on Oct. 7, 2002.

(51) Int. Cl.
*G01F 15/00* (2006.01)

(52) U.S. Cl. ....................................... 73/295

(58) Field of Classification Search .................. 73/292, 73/295, 291, 290 R; 374/137, 110–115
See application file for complete search history.

(56) References Cited

U.S. PATENT DOCUMENTS

| | | | |
|---|---|---|---|
| 1,590,505 A * | 6/1926 | Hanna et al. ................. | 73/295 |
| 1,962,187 A * | 6/1934 | Flock .......................... | 73/295 |
| 2,246,563 A * | 6/1941 | Winters ....................... | 196/132 |
| 3,653,262 A * | 4/1972 | Ehrenfried et al. ......... | 374/142 |
| 3,745,828 A * | 7/1973 | Howell ........................ | 73/295 |
| 3,797,310 A * | 3/1974 | Babcock et al. ............. | 73/295 |
| 4,065,967 A * | 1/1978 | Beeston ....................... | 73/295 |
| 4,307,606 A * | 12/1981 | Johnson ..................... | 73/295 |
| 4,320,656 A * | 3/1982 | Tiskus ......................... | 73/295 |
| 4,440,509 A * | 4/1984 | Agarwal ...................... | 374/166 |
| 4,523,460 A * | 6/1985 | Strickler et al. ............. | 73/200 |
| 4,568,821 A | 2/1986 | Boe | |
| 4,635,478 A * | 1/1987 | Hope .......................... | 73/292 |
| 4,912,977 A * | 4/1990 | Hope .......................... | 73/295 |
| 4,915,507 A * | 4/1990 | Janotta ....................... | 374/115 |
| 5,023,432 A | 6/1991 | Boykin et al. | |
| 5,058,804 A | 10/1991 | Yonekubo et al. | |
| 5,067,170 A | 11/1991 | Nagashima et al. | |
| 5,956,462 A | 9/1999 | Langford | |
| 6,202,486 B1 * | 3/2001 | Kemp .......................... | 73/295 |
| 6,246,831 B1 | 6/2001 | Seitz et al. | |
| 2002/0175828 A1 | 11/2002 | Macey | |

FOREIGN PATENT DOCUMENTS

| | | | |
|---|---|---|---|
| DD | 0222402 | * | 5/1985 |
| EP | 0119072 | * | 9/1984 |
| GB | 2278448 A | * | 5/1994 |
| WO | WO 8805160 A1 | * | 7/1988 |

\* cited by examiner

*Primary Examiner*—Daniel S. Larkin
*Assistant Examiner*—John Fitzgerald
(74) *Attorney, Agent, or Firm*—John V. Stewart

(57) ABSTRACT

A vertical series of electrical heat sensors adhered to the outer surface of a water heater tank. The sensors are electrically connected to a corresponding vertical series of display lights in reverse order. Heated water fills the tank from the top down. The sensors are activated from the top down based on the amount of hot water in the tank. The lights are correspondingly activated from the bottom up, showing the tank "filling-up" with hot water. The lights can be labeled such as "Full", "Half Full", etc. The sensors can be provided in sequence on a rod with magnets. Thus, the rod can be quickly attached to the tank, holding the sensors in a vertical line in the correct order. Displays can be remote from the tank via wiring or radio signaling, allowing them to be mounted in each bathroom or elsewhere.

6 Claims, 3 Drawing Sheets

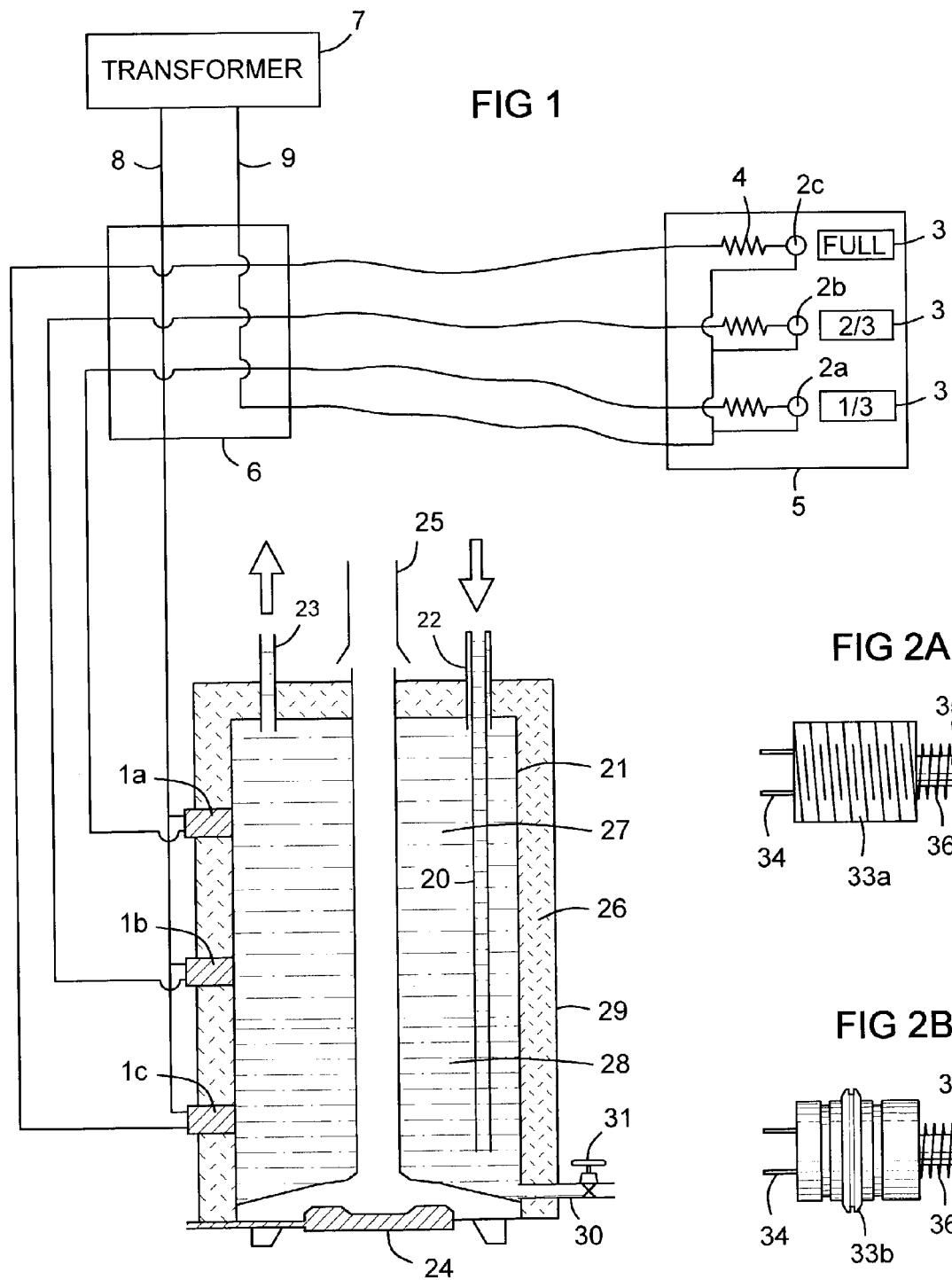

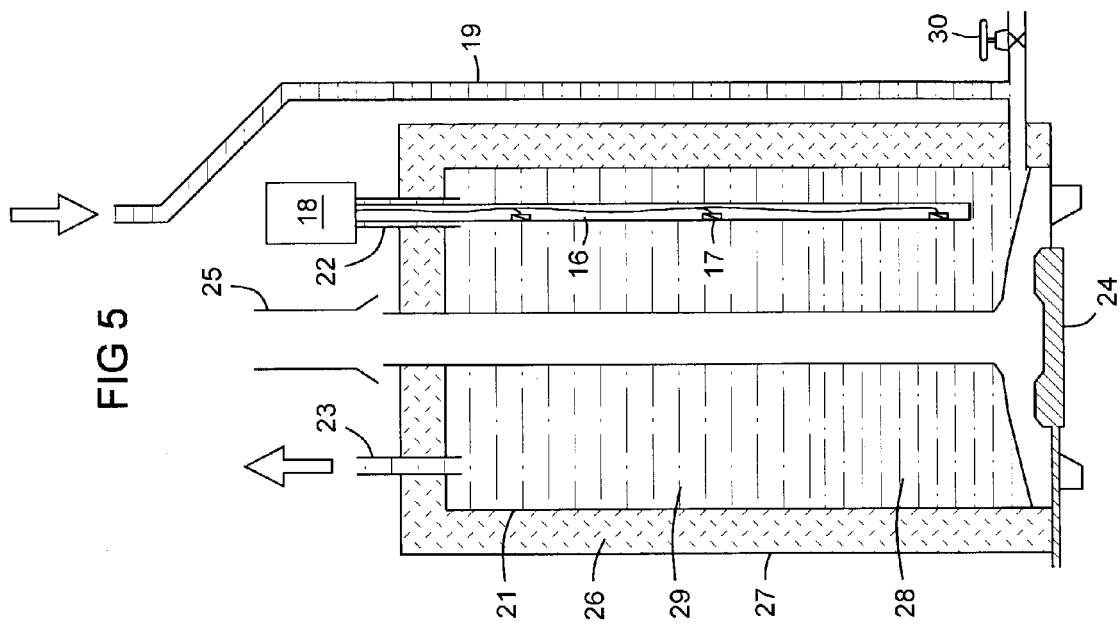
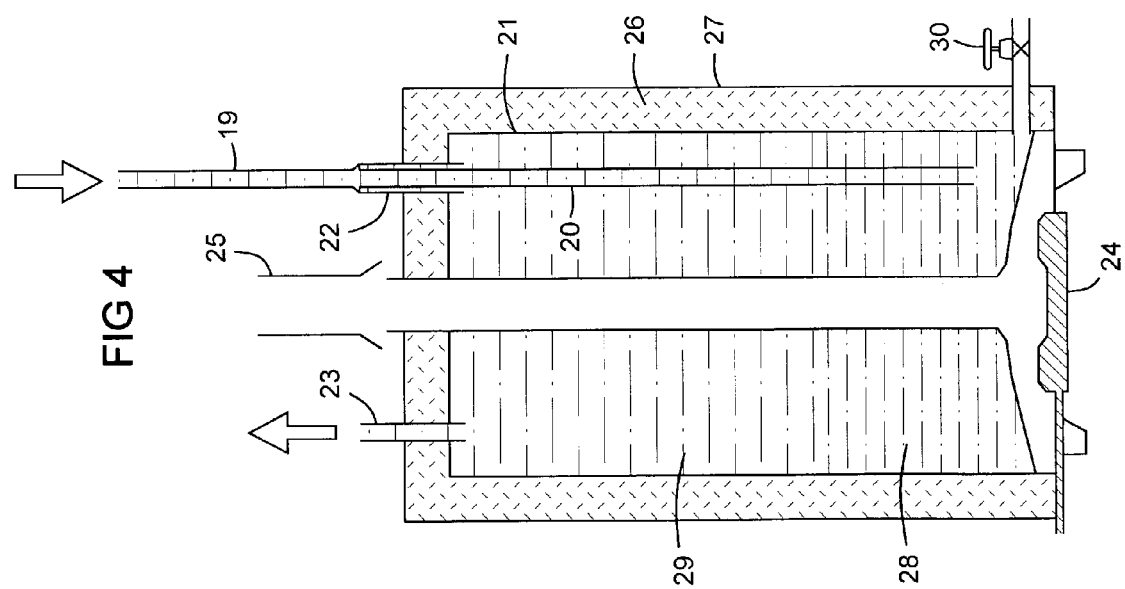

STRATIFIED HOT WATER HEATED DEPTH DISPLAY SYSTEM

CROSS-REFERENCE TO RELATED APPLICATIONS

This application claims the benefit of U.S. provisional patent application No. 60/416,444, filed on Oct. 7, 2002.

BACKGROUND OF THE INVENTION

1. Field of the Invention

This invention relates to devices for sensing and indicating the proportion of water in a hot water tank that is heated, assuming the heated water accumulates from the top of the tank downward.

2. Description of Prior Art

With a conventional tank type residential hot water heater, a person has no way of knowing if there is enough hot water in the tank to take a shower or bath. This is especially true when multiple people in a house use hot water for showers, clothes washing, and dish washing.

U.S. Pat. No. 5,956,462 (Langford) discloses a vertical series of temperature sensors on a water heater storage tank to determine the vertical level of stratified heated water in the tank. A single heating element is provided at the bottom of the tank with a flue to guide heated water to the top of the tank to stratify it. The sensors give input to a microprocessor that calculates a "need" index to be compared to an electric utility company priority index that is transmitted to the microprocessor from the electric utility. This determines when power is applied to the heater, based on user need and supplier priority. Thus, it reduces peak concurrent electricity demand from users for a power utility. However, it does not provide a visual display for the user from the temperature sensors.

U.S. Pat. No. 5,067,170 (Nagashima et al.) also discloses a vertical series of temperature sensors on a water heater storage tank to determine the vertical level of stratified heated water in the tank. A small secondary water tank with a heating element and temperature sensor is used to heat water and circulate it to the top of the main tank. The amount of hot water to be maintained in the main tank is selectable, thus potentially saving water and/or energy. A controller stops the heating process when the selected level of stratified heated water in the main tank is reached.

These automated devices are unnecessarily complex, yet they still do not give a user the information and control of the present invention. No automated device can fully predict the times and amounts of hot water used by multiple people in a house, especially on weekends, with people on flexible work schedules, with children, and with visitors. These prior devices are too complex to be retrofitted to an existing conventional hot water heater tank.

SUMMARY OF THE INVENTION

An object of the invention is to display the amount of hot water available in a residential hot water tank, to avoid the discomfort of a cold shower. A second object is to save water and energy. A third object is simplicity and low cost for purchase and installation. A fourth object of the invention is practical retrofit installation on existing conventional hot water heaters.

These objectives are achieved by a vertical series of temperature sensors adhered to the outer surface of a water heater tank. The sensors are electrically connected to a corresponding vertical series of display lights in reverse order. Heated water fills the tank from the top down. The sensors are activated from the top down based on the amount of hot water in the tank. The lights are correspondingly activated from the bottom up, showing the tank "filling-up" with hot water. The lights can be labeled such as "Full", "Half Full", etc. The sensors can be provided pre-attached in proper sequence on a rod with magnets. The rod can be quickly attached to the tank with the magnets, holding the sensors in a vertical line in the correct order. One or more displays can be remote from the tank, allowing them to be mounted in each bathroom or elsewhere.

BRIEF DESCRIPTION OF THE DRAWINGS

FIG. 1 is a schematic view of the basic elements and connections of the invention FIG. 2A is an external view of a threaded heat sensor for installation as in FIG. 1

FIG. 2B is an external view of a grommeted heat sensor for installation as in FIG. 1

FIG. 4 is a schematic view of an unmodified water heater FIG. 5 is a schematic view of a water heater modified by rerouting the water supply pipe and replacing the dip tube with a sensor tube and display.

REFERENCE NUMBERS

Figure 3:
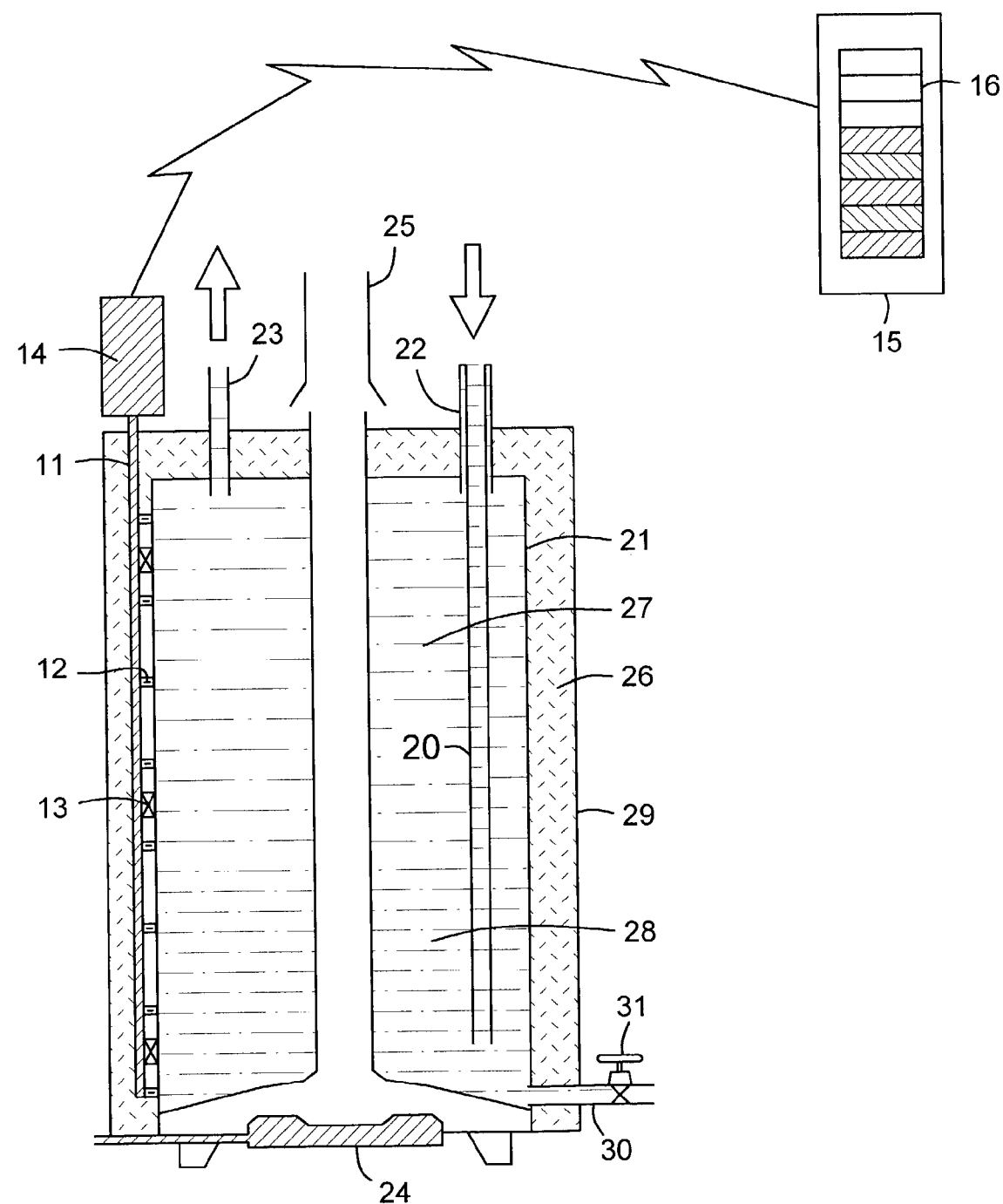
FIG. 3 is a schematic view of a preferred embodiment with a quick-attachment rod of sensors

1a. Top heat sensor
1b. Intermediate heat sensor
1c. Bottom heat sensor
2a. Bottom display light or device
2b. Intermediate display light or device
2c. Top display light or device
3. Level indicator label or lens
4. Resistor
5. Display panel
6. Junction box
7. Transformer
8. Low voltage electric line
9. Neutral electric line
11. Sensor rod
12. Heat sensor on sensor rod
13. Magnet on sensor rod
14. Radio signal transmitter
15. Remote display
16. Sensor tube
17. Heat sensor in sensor tube
18. Display panel on sensor tube
19. Water supply pipe
20. Water inlet dip tube
21. Hot water tank
22. Unheated water inlet
23. Hot water outlet
24. Heater
25. Heater exhaust flue
26. Insulation
27. Heated water
28. Unheated water
29. Tank cladding
30. Tank drain tube
31. Tank drain valve
32. Sensor portion of threaded or grommeted sensor
33a. Thread portion of threaded sensor
33b. Grommet portion of grommeted sensor 34. Electrical contacts on threaded or grommeted sensor
35. Stem portion of threaded or grommeted sensor
36. Spring means on threaded or grommeted sensor

DETAILED DESCRIPTION

FIG. 1 shows a vertical series of temperature sensors 1a–1c adhered to the outer surface of a water heater tank 21. The sensors are electrically connected to a corresponding series of light-emitting diodes (LED's) 2a–2c or other display device, such as a liquid crystal display, in a display panel 5. The display panel can be attached to the exterior of the heater, to the wall near the heater, or elsewhere in the house.

Heated water will fill the tank from the top down, due to the lower density of heated water over unheated water. The sensors are activated from the top down based on the amount of hot water in the tank. The upper sensors will be activated first, then lower and lower sensors, until the water is fully heated. The display indicates to a user whether there is enough hot water for a shower.

The display panel has a vertical sequence of indicators in the reverse order of the sensors, to show the tank "filling-up" with hot water. The indicators can be labeled such as "Full", "Half Full", etc. As shown in FIG. 3, a display 15 can be remote. Remote displays can be electrically connected to the sensors by cable, or they can receive a radio signal from a transmitter 14 attached to the sensors on the water heater, using known radio frequency signaling technology. This allows a display to be easily mounted beside each shower stall or elsewhere in a house.

Threaded heat sensors as in FIG. 2A can be easily installed by drilling a hole in the water heater cladding 29, and threading the sensor into the hole. Threads 33a on the sensor are preferably of the self-starting and/or self-tapping type. Alternately, the sensor can have a flexible grommet 33b instead of threads, or it can have both threads and an internally threaded grommet, giving the user an option. The grommet has one or more external grooves, lips, or tabs that engage the hole drilled in the water heater cladding. In either case, the sensor portion 32 is preferably slidable relative to the thread or grommet portion, and is urged away from the thread or grommet portion by a spring or elastic material 36. This assures that the sensor contacts the tank with a moderate force similar to that of the other sensors.

In a preferred embodiment shown in FIG. 3, heat sensors 12 are supplied pre-attached to a rod 11 in their proper sequence. Magnets 13 are also attached to the rod. The user simply attaches the rod to the water tank 21 with the magnets. This instantly mounts the sensors in a vertical line in the correct order on the tank. The number and positions of magnets is a design choice, but preferably the rod is semi-flexible, and there is a magnet on each side of each sensor, so that all sensors contact the side of the tank uniformly. If the tank insulation is a foam type, a vertical passage next to the tank can be melted in it with a heated metal rod or tube to provide space for the sensor rod.

The heat sensors can be bimetallic switches, thermistors, or other known types of electrically indicating heat sensors. Low voltage electric power is supplied to the system by a battery (not shown) or a transformer 7, using conventional technology. The number of heat sensors is a design choice. For example, eight sensors 11 are shown in FIG. 3, controlling a vertical array 16 of eight indicators. A suggested material for the rod 11 of FIG. 3 is nylon, but this is a design choice. It can optionally be formed as a flexible tape, and coiled for packaging.

FIG. 5 shows an embodiment in which heat sensors 17 are provided in a hollow sensor tube 16 that is smaller in outer diameter than the inner diameter of a conventional inlet tube 22. A display panel 18 is attached to the top of the sensor tube, along with necessary electronics. In a retro-fit installation, the water heater inlet supply line 19 is re-routed from the heater inlet 22 to the drain tube 30, leaving the inlet tube 22 open at the top. The dip tube 20 is removed. The sensor tube is then inserted into the tank inside the inlet tube, replacing the dip tube. The inlet tube is sealed around the sensor tube at the top end. Preferably a threaded fitting is provided soldered or otherwise attached and sealed on the top of the sensor tube, and is threaded onto the inlet tube threads with sealant. Optionally, the display panel 18 can include a radio signal transmitter for remote receiver/display panels.

The invention as shown in FIG. 1 has been tested in the inventor's home on his existing conventional gas hot water heater, and it operates properly and dependably. The inventor has found that a water thermal stratifying mechanism other than a standard dip tube is not needed for satisfactory operation. With 3 sensors, no temperature inversions occur. In addition to avoiding a shower that turns unexpectedly cold, it saves water and energy by avoiding turning on a hot water valve in the shower, and waiting for hot water when none is available in the tank. It also avoids the need for a larger capacity hot water tank or a higher thermostat setting to be sure hot water is available.

Although the present invention has been described herein with respect to preferred embodiments, it will be understood that the foregoing description is intended to be illustrative, not restrictive. Modifications of the present invention will occur to those skilled in the art. All such modifications that fall within the scope of the appended claims are intended to be within the scope and spirit of the present invention.

I claim:

1. A stratified hot water heated depth display system, comprising:
   a plurality of electrically indicating heat sensors in a vertical sequence on a rod;
   at least one permanent magnet on the rod;
   a display panel with a series of electrically controlled visual indicators corresponding to the heat sensors in reverse vertical order;
   means for communicating an electrical signal from each of the sensors to each corresponding visual indicator.

2. The display system of claim 1, wherein:
   the communicating means comprises a radio signal transmitter electrically attached to the sensors, that transmits signals containing information on the state of each of the sensors; and
   a radio signal receiver in the display panel for receiving radio signals from the transmitter and converting those signals to electrical signals communicated to each of the indicators.

3. The display system of claim 1, for user installation in a water heater having a hot water tank with an exterior surface surrounded by insulation surrounded by cladding with a top, wherein the rod is inserted in vertical orientation between the insulation and the exterior of the tank through a hole in the top of the cladding.

4. A stratified hot water heated depth display system for use in combination with a hot water tank having an exterior surface, the display system comprising:

a plurality of electrically indicating heat sensors mounted on a rod;

at least one permanent magnet mounted on the rod;

the rod attached in a vertical orientation to the exterior surface of the water tank by means of the at least one magnet, with the heat sensors contacting the tank a vertical sequence;

a display panel with a series of electrically controlled visual indicators corresponding to the heat sensors in reverse vertical order; and means for communicating an electrical signal from each of the sensors to each corresponding visual indicator.

5. The display system of claim 4, wherein the communicating means comprises:

a radio signal transmitter electrically attached to the sensors, that transmits signals containing information on the state of each of the sensors; and a radio signal receiver in the display panel for receiving radio signals from the transmitter and converting those signals to electrical signals communicated to each of the indicators.

6. The display system of claim 4, for user installation in a water heater having a hot water tank with an exterior surface surrounded by insulation surrounded by cladding with a top, wherein the rod is inserted in vertical orientation between the insulation and the exterior of the tank through a hole in the top of the cladding.

* * * * *